United States Patent [19]

Brown

[11] Patent Number: 5,638,831

[45] Date of Patent: Jun. 17, 1997

[54] METHOD OF PREVENTING REPETITIVE STRESS INJURIES DURING COMPUTER KEYBOARD USAGE

[75] Inventor: Stephanie Louise Brown, New York, N.Y.

[73] Assignee: Ergonome Incorporated, New York, N.Y.

[21] Appl. No.: 335,659

[22] Filed: Nov. 8, 1994

[51] Int. Cl.$^6$ .................................................. A61B 19/00
[52] U.S. Cl. ................................................................ 128/898
[58] Field of Search ..................................... 128/845, 846, 128/898, 876; 400/472, 484–489

[56] References Cited

U.S. PATENT DOCUMENTS

| | | | |
|---|---|---|---|
| 5,086,762 | 2/1992 | Chee | 128/876 |
| 5,336,001 | 8/1994 | Lichtenberg | 400/489 |
| 5,369,805 | 12/1994 | Bergsten | 297/411.35 |
| 5,492,291 | 2/1996 | Otani | 248/118.1 |

OTHER PUBLICATIONS

Cortot, Alfred, *Rational Principles of Pianoforte Technique*, Editions Salabert, France (1930).
Sandor, Gyorgy, *On Piano Playing—Motion, Sound and Expression*, Schirmer Books, New York (1981).
Neuhaus, Heinrich, *The Art of Piano Playing*, Barrie & Jenkins Ltd., London, England (1973).
Bree, Malwine, *The Groundwork of the Leschetizky Method*, G. Schirmer, Inc., New York (1930).
Schick, Robert D., *The Vengerova System of Piano Playing*, The Pennsylvania State University (1982).

*Primary Examiner*—Michael A. Brown
*Attorney, Agent, or Firm*—Darby & Darby, P.C.

[57] ABSTRACT

A method for providing a fluid line between the hand, wrist and forearm, includes steps of moving the hand and wrist in a straight and fluid line with the forearm thereby forming a natural line position, reaching for an object with the hand and allowing the elbow to follow the hand naturally, angling the hand and wrist sideways towards the forearm, thereby forming an angled wrist position, moving the wrist in the straight and fluid line position with the forearm, and placing the hand in the straight and fluid line over a keyboard. The method further comprises the steps of placing the hand on a keyboard and without typing, moving from a natural line position to an angled wrist position and then back again, and placing the fingers on the keys and with the arm and wrist in the natural line position, typing at a slow and gentle pace. The method further comprises the steps of dropping the hand down to the side of the body, angling the wrist upward and then letting the wrist slowly drop back in a downward position and relaxing so that the hand is relaxed, distinguishing between the strained feeling of holding the wrist up and a natural feeling of letting the wrist hang from the shoulder, placing the hand on the keyboard in a typing position, observing if there is any upward bend at the wrist, and raising or lowering the keyboard until the wrist feels completely relaxed. The method further comprises the steps of moving the elbow towards the side of the body in a pendulum motion, moving the elbow away from the side of the body in a pendulum motion, and reducing the movement until the elbow comes to a resting position, thereby allowing the hand and wrist to be in the natural fluid position. The method further comprises the steps of resting the right hand on a surface with the fingertips downwardly engaging the surface and the palm positioned above the table, allowing the weight of the arm to rest on the fingers until the fingers support the weight of the arm, moving the right elbow with the left hand and gently swinging the right elbow forward until the wrist rises and then allowing the wrist to return, and moving the fingers up and down while moving the elbow until the movement of the fingers requires the least effort.

14 Claims, 15 Drawing Sheets

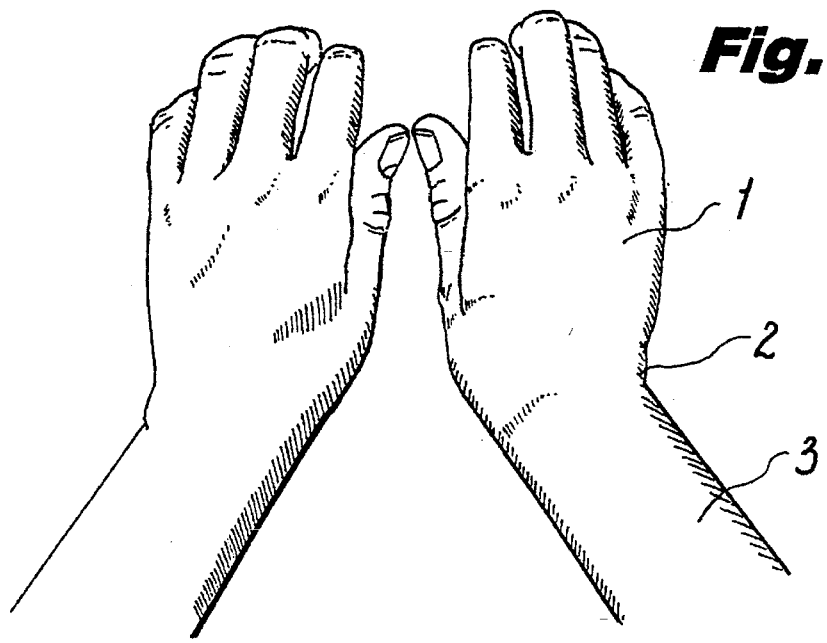
Fig. 1a
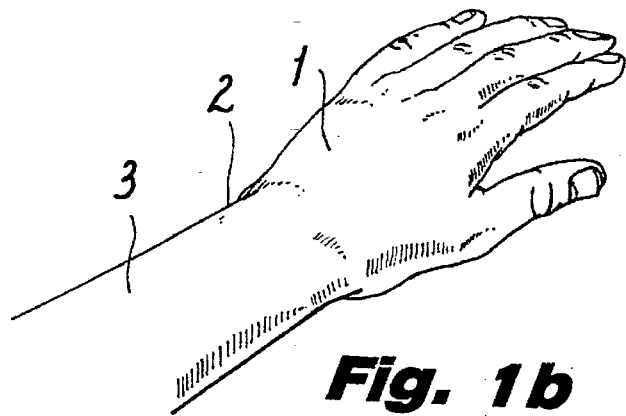
Fig. 1b
Fig. 1c
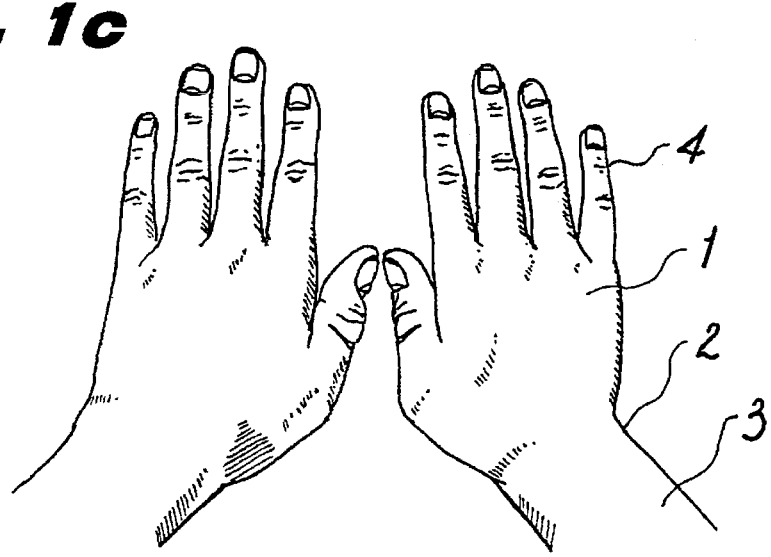

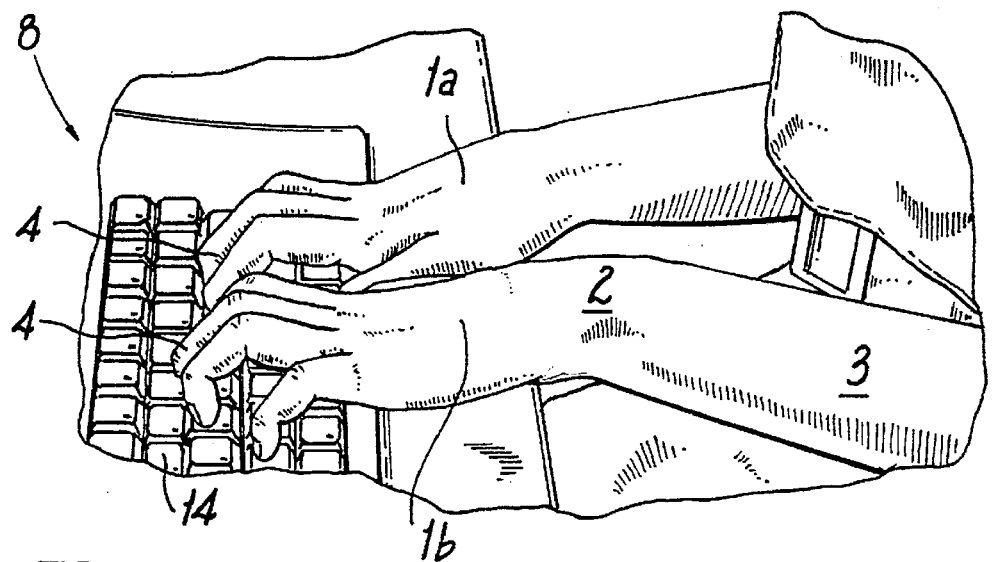
Fig. 8a
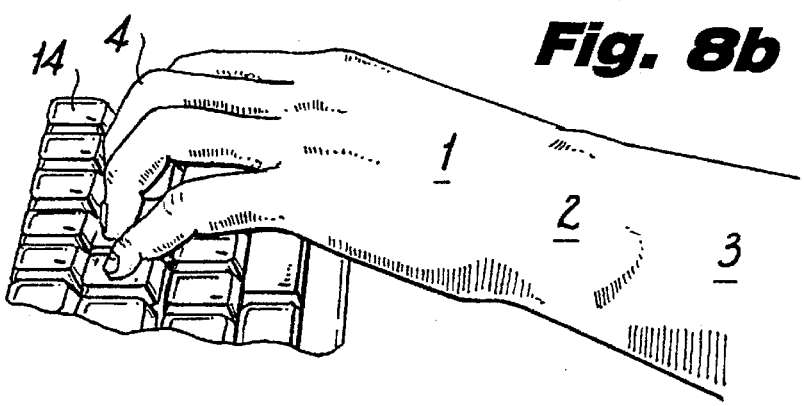
Fig. 8b
Fig. 8c
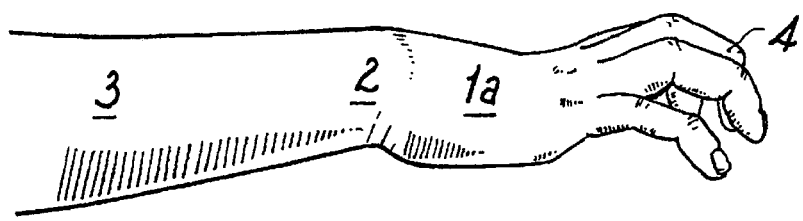
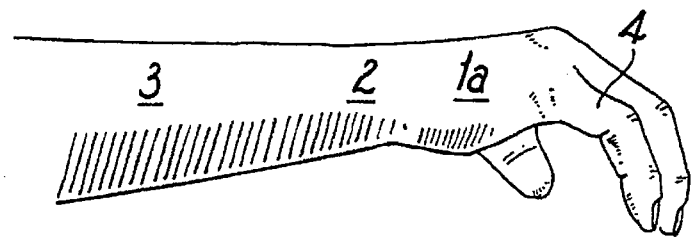
Fig. 8d

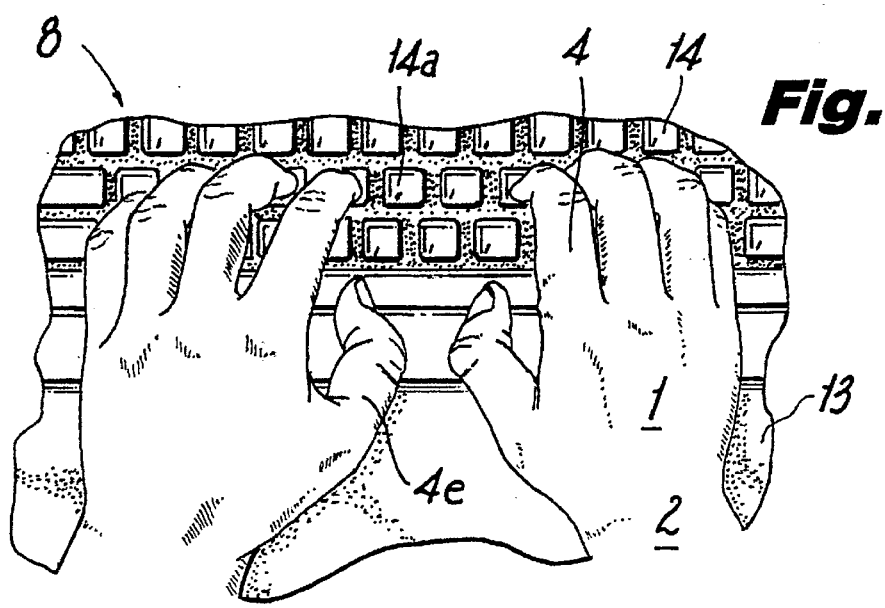
Fig. 9a
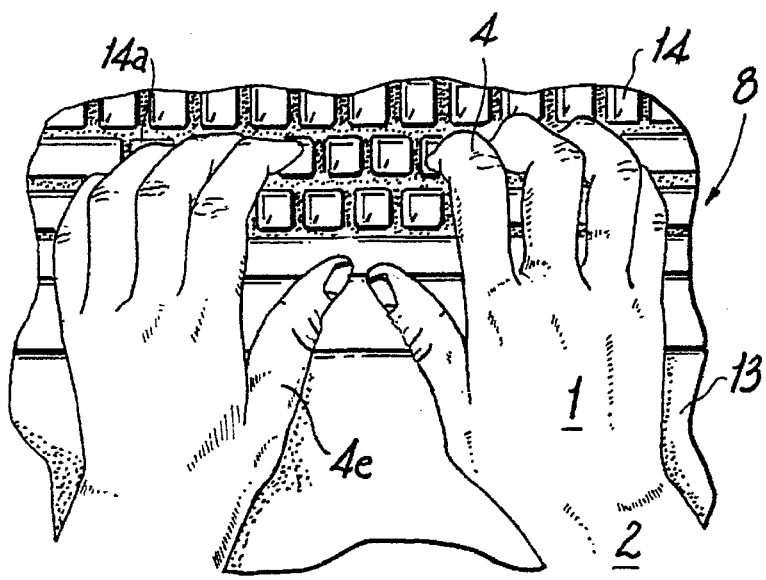
Fig. 9b
Fig. 9c
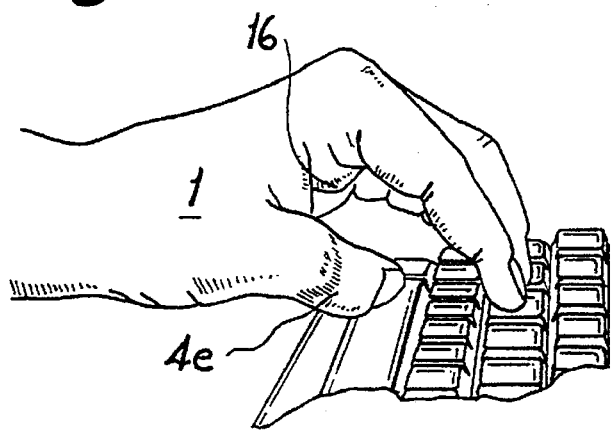
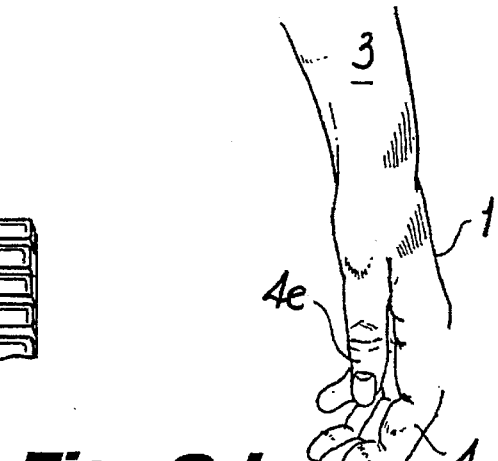
Fig. 9d

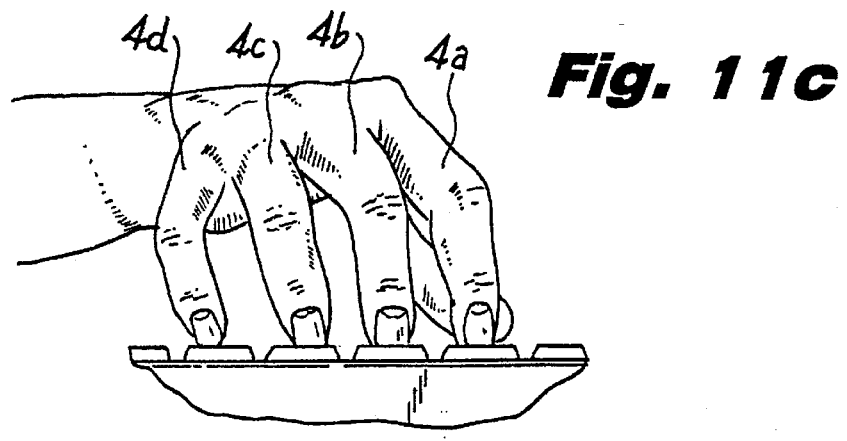
Fig. 11c
Fig. 12a
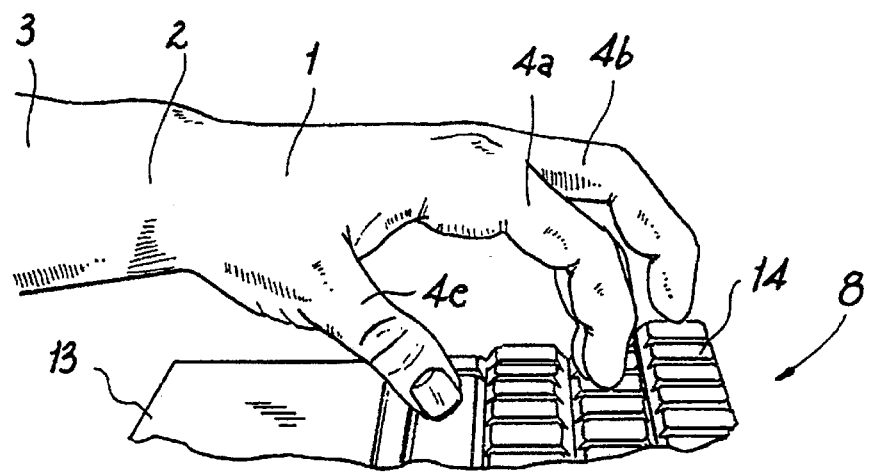
Fig. 12b
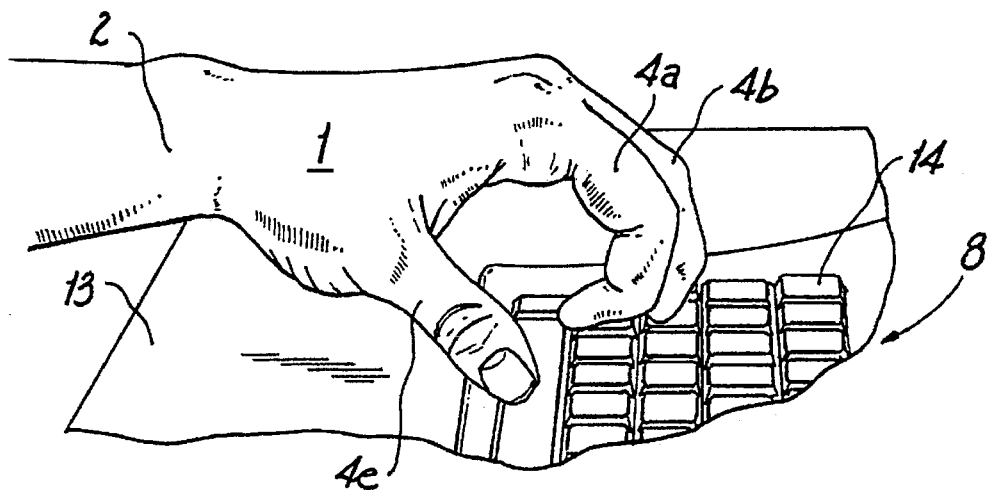

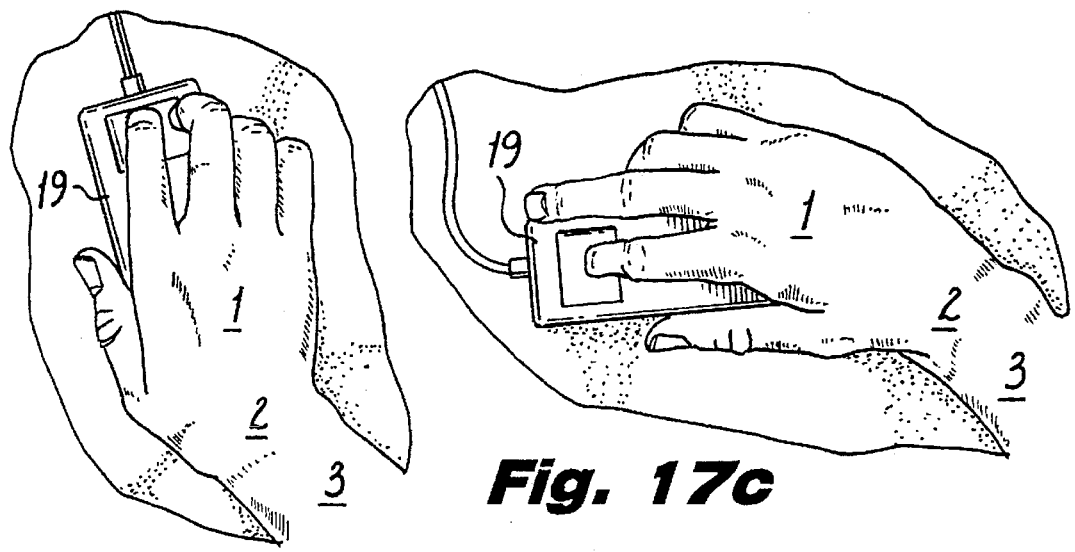
Fig. 17b
Fig. 17c
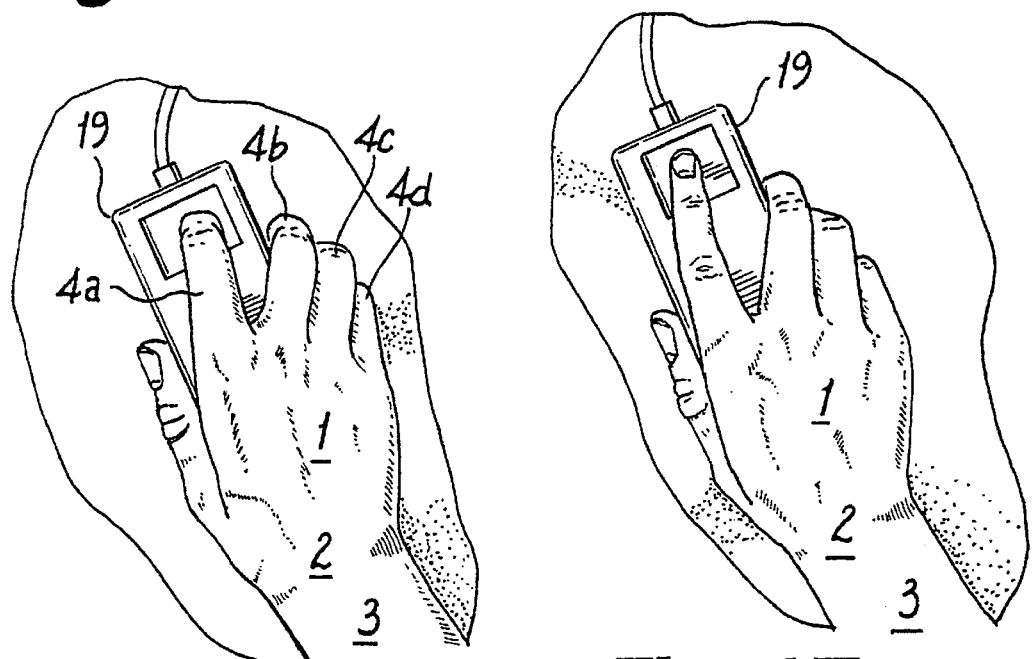
Fig. 17d
Fig. 17e
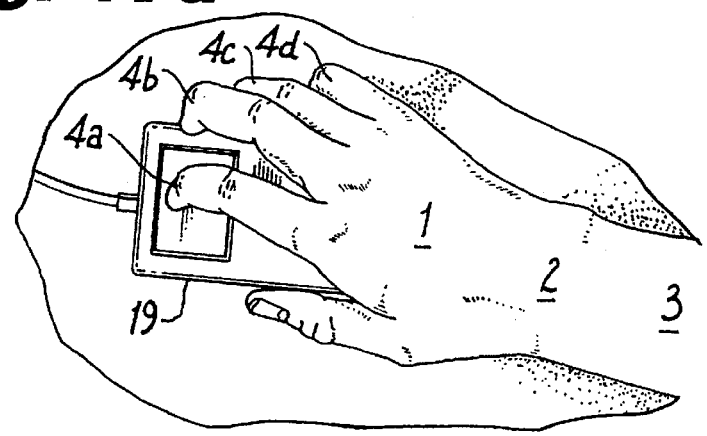
Fig. 17f

METHOD OF PREVENTING REPETITIVE STRESS INJURIES DURING COMPUTER KEYBOARD USAGE

FIELD OF THE INVENTION

This invention relates generally to a method of preventing repetitive stress injuries, and more particularly, to a method of preventing repetitive stress injuries during computer keyboard usage.

BACKGROUND OF THE INVENTION

In recent years there has been a rapid increase in the number of people who suffer from computer-related hand injuries. Known as Repetitive Stress Injuries (RSI) or Cumulative Trauma Disorders (CTD), these conditions include tendinitis, carpal tunnel syndrome, cysts and bursitis. Symptoms can range from feelings of numbness, tingling, burning and throbbing to weakness and even paralysis in the fingers, hands and arms. Afflicted people face possible surgery, extensive loss of time at work, and, in some cases, even eventual unemployment. Often the simplest of tasks, such as picking up a fork, will be excruciatingly painful for them.

A three-year study by the National Institute for Occupational Safety and Health estimated that more than 20 percent of people whose work is primarily at a computer keyboard are affected.

The idea that certain motions or positions can cause injury is known in virtually every field of sports. When playing golf or tennis, chances are the individual has had lessons to learn the "right" way to perform a stroke. The individual worked on it and learned how to avoid positions and motions which are dangerous and are known to cause painful conditions like tennis-elbow, bursitis or tendinitis. Also at one time or another, the individual had the experience of watching someone swing a tennis racquet or golf-club and thinking that the stroke just looked wrong.

Typing at a computer keyboard may not be a sport, but with RSI's becoming so prevalent, it is clear that it must be seen as an athletic activity, with many of the risks and dangers of any athletic activity. Typing may be micro-athletic, but it is athletic nonetheless. The actual motions used in typing are small and so are the muscles involved, but that just makes the muscles all the more prone to injury. A shoulder or a thigh muscle can take a great deal more use and abuse than a tiny tendon in the hand. The slightest swelling of these tendons, or in the sheaths which protect them, can lead to debilitating pain and make it virtually impossible for one to type, or do much else.

Until now there have been several solutions for sufferers of RSI's. First, inventors have been rushing to design new keyboards, some of them requiring that the user learn a totally new typing system. Although others of the new keyboards use the traditional key layout, they are expensive, and while some of them may be beneficial, this book will demonstrate that they are not necessary for safe typing.

For the already injured, there is no substitute for the counsel and care of skilled physicians, and the medical profession has developed extensive means of helping such people to manage their injuries. These include physical therapy, anti-inflammatory drugs, anesthetics, muscle relaxants, cryotherapy (cold) and thermotherapy (heat therapy).

Splints can be placed on the hands and forearms of some victims to prevent them from getting into unnatural positions while they're typing. Unfortunately, however, these are effective on only a few of the dangerous positions, and they can sometimes even be harmful because they lock the forearms and wrists into stationary positions. The hand surgeon Peter A. Nathan was quoted in CTD News, an occupational health newsletter, as having said, "The benefits of immobilization through splints and braces is an old wives' tale. Splinting can cause a weakness in forearm muscles that bend and straighten the wrist and fingers."

The constriction of natural motion can be as dangerous to the arms as the unnatural positions which the splints are intended to prevent. Splints are a temporary solution, at best, and when they're off the wearers often go back to the habits that brought them to grief in the first place.

Other remedies include the injection of cortisone to reduce swelling and, in cases of carpal tunnel syndrome, surgery to cut the ligament at the base of the wrist. Obviously, neither is without its unwanted consequences, and even after such serious treatment patients who have not learned safer ways to work at their computers will revert to old habits, with the expectable result. As the Mayo Clinic reported in its Proceedings of July, 1989, "If followed by a return to the same traumatic environment, the operation is often unsuccessful in controlling symptoms."

Still another solution is to find a new occupation, one which doesn't involve working at a computer. Although sometimes companies can offer their employees alternative jobs, obviously this is simply not a possibility for most people. It also leads to another extremely unfortunate phenomenon, namely that some people are afraid to report these problems for fear of being thought difficult or even getting fired. Here the afflicted are caught in a double bind, because by putting off treatment they only insure that their problems will grow still worse.

The oldest cure of all is, of course, rest, and sometimes doctors are compelled to advise people that they face a lifetime of pain and perhaps permanent crippling if they don't take off from work for anywhere from a few months to several years. Unfortunately, however, the economic repercussions of this prescription are usually at least as severe as trying to find a new line of work.

As extreme as these solutions are, they do not attack the problem at its origin, namely, what people are doing at their computer to hurt themselves. They are all responses to the effects of Repetitive Stress Injuries.

SUMMARY OF THE INVENTION

Accordingly, it is the object of the present invention to provide a method of preventing repetitive stress injuries during computer keyboard usage.

It is a further object of the invention to provide a method for teaching the correct finger, hand, wrist and forearm positions and motions during computer keyboard usage.

It is a further object of the present invention to provide a method for establishing a natural line between the hand, wrist and forearm, comprising the steps of moving the hand and wrist in a straight and natural line with the forearm thereby forming a natural line position, reaching for an object with the hand and allowing the elbow to follow the hand naturally, angling the hand and wrist sideways relative to the forearm, thereby forming an angled wrist position, returning the wrist to the straight and fluid line position with the forearm, and placing the hand in the straight and fluid line on a keyboard.

It is a further object of the present invention to provide a method further comprising the steps of placing the hand on a keyboard and without typing, moving from a natural line position to an angled wrist position and then back again, and placing the fingers on the keys and with the arm and wrist in the natural line position, typing at a slow and gentle pace.

It is a further object of the present invention to provide a method further comprising the steps of dropping the hand down to the side of the body, angling the wrist upward and then letting the wrist slowly drop back in a downward position and relaxing so that the hand is relaxed, distinguishing between the strained feeling of holding the wrist up and a natural feeling of letting the wrist hang from the shoulder, placing the hand on the keyboard in a typing position, observing if there is any upward bend at the wrist; and raising or lowering the keyboard until the wrist feels completely relaxed.

It is a further object of the present invention to provide a method further comprising the steps of moving the elbow towards the side of the body in a pendulum motion, moving the elbow away from the side of the body in a pendulum motion, and reducing the movement until the elbow comes to a resting position, thereby allowing the hand, wrist and elbow to be in the natural line position.

It is a further object of the present invention to provide a method further comprising the steps of resting the right hand on a surface with the fingertips downwardly engaging the surface and the palm positioned above the table, allowing the weight of the arm to rest on the fingers until the fingers support the weight of the arm, moving the right elbow with the left hand and gently swinging the right elbow forward until the wrist rises and then allowing the wrist to return, and moving the fingers up and down while moving the elbow until the movement of the fingers requires the least effort.

It is a further object of the present invention to provide a method further comprising the steps of moving the fingers upward in relation to the palm of the first hand in a spider position, and reaching with the second hand under the knuckles and slowly raising the knuckles of the first hand until the fingers relax, thereby forming the curve of the fingers.

It is a further object of the present invention to provide a method further comprising the steps of moving the first hand to rest on a surface in a relaxed position with the fingertips engaging the surface, thereby forming the natural curve of the fingers, and moving the hand in the natural curve position to the keyboard.

It is a further object of the present invention to provide a method further comprising the steps of dropping the hand to the side in a relaxed position thereby forming the natural thumb position, moving the hand to the keyboard and engaging the keys with the fingers while maintaining the hand in the natural thumb position, and dropping the thumb in the natural position in an up and down motion to depress the space bar and then releasing the space bar.

It is a further object of the present invention to provide a method further comprising the steps of resting the hand on a surface with the fingertips downwardly engaging the surface in a relaxed position, drumming the fingers, tightening the fingers, and drumming the fingers while relaxing the fingers.

It is a further object of the present invention to provide a method further comprising the steps of resting the hand on a surface in a relaxed position with the knuckles naturally tilted, moving the hand to the keyboard while maintaining the natural tilt position, and resting the thumb on the space bar in a relaxed position.

It is a further object of the present invention to provide a method further comprising the steps of resting the fingertips lightly on the keys of a keyboard, dropping the index finger on the respective key, raising the index finger from the respective key, and observing the key moving downward and upward and the hand rocking slightly.

It is a further object of the present invention to provide a method further comprising the steps of moving the hand to a surface with the fingertips downwardly engaging the surface and the palm positioned above the surface, moving the hand to conform to a spherically shaped object having a first size, moving the hand to conform to a spherically shaped object having a second size greater than the first size, moving the hand to conform to the first object, and moving the hand to the keyboard while maintaining the shape of the first object.

It is a further object of the present invention to provide a method further comprising the steps of moving the hand over a keyboard, moving the hand in the north, south, east and west directions with respect to the keyboard while also moving the wrists, elbows and arms, and typing while moving the hand in the north, south, east and west directions.

BRIEF DESCRIPTION OF THE DRAWINGS

FIGS. 1a–1d are top views illustrating the difference between the natural line position and the angled wrist position.

FIGS. 8a–8d are perspective views of the spider position and the rainbow position.

FIGS. 9a–9e are top and side views of various thumb positions.

FIGS. 11a–11c are frontal views of the claw position and the natural tilt position.

FIGS. 12a–12c are side views of the climbing stair positions, the scratching position and the dropping position.

FIGS. 17a–17f are top and side views of various hand positions in relation to a computer mouse.

DETAILED DESCRIPTION OF THE INVENTION

Figure 1D:
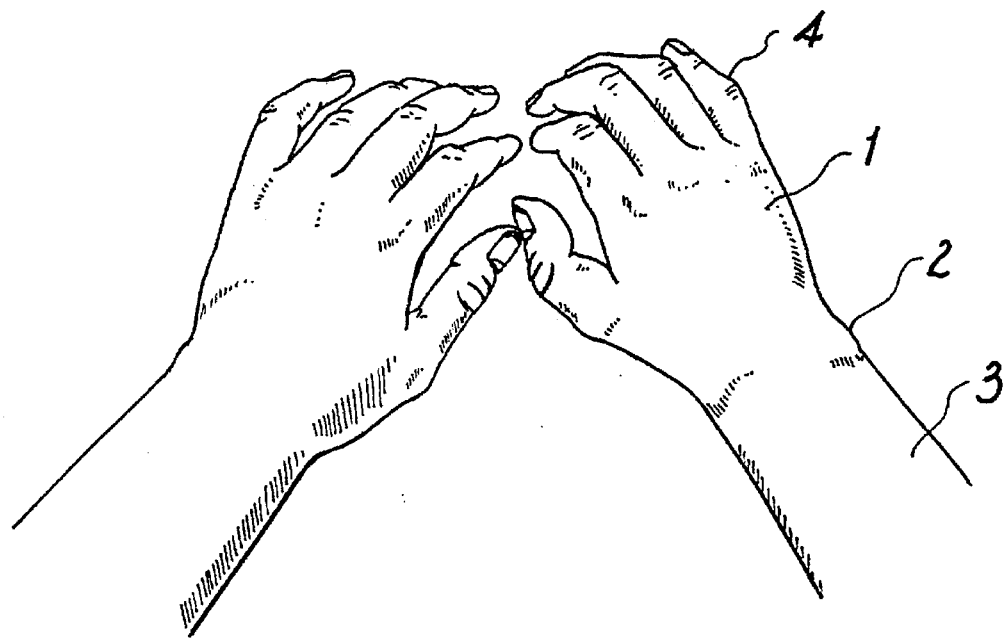

Referring to FIGS. 1a–1d, the first method is illustrated for establishing a fluid or natural line position. Specifically, FIG. 1a illustrates an unnatural positioning of the hands 1, wrists 2 and forearms 3. This position is referred to as the dangerous angle or the angled wrist position. Referring to FIG. 1b, the hand 1, wrist 2 and forearm 3 are positioned in a preferred natural line. Positioning the hand out of alignment with the forearm (FIG. 1a) creates the dangerous angle position. The angled wrist position is unnatural for the body and is one of the leading causes of crippling computer injuries. The preferred method of correcting the dangerous angle position involves moving the hand and wrist in a straight and fluid line with the forearm 3 thereby forming a natural line position, reaching for an object with the hand 1 and allowing the elbow 5 (not shown) to naturally follow the hand 1, angling the wrist 2 into the dangerous angle position of FIG. 1a, observing the loss of the straight and fluid line of the forearm 3 and hand 1, switching back and forth between the natural line position of FIG. 1b and the dangerous angle position of FIG. 1a, and finally, relaxing the hand 1 and wrist 2 to observe the natural straight and fluid line between the forearm 3 and hand 1.

After following this method to establish the fluid or natural line, the hands 1 are placed either on a flat surface or on the keyboard itself maintaining the fluid line position. They are then to be placed in the dangerous angle position as shown in FIG. 1c. The hands 1 are then placed in the fluid line position of FIG. 1d while remaining on the flat surface or the keyboard. This method emphasizes the unnatural positioning between the dangerous angle position as opposed to the fluid line position. The fluid line position is not only more comfortable, it is also more efficient and prevents serious computer-related hand injuries.

Figure 2:
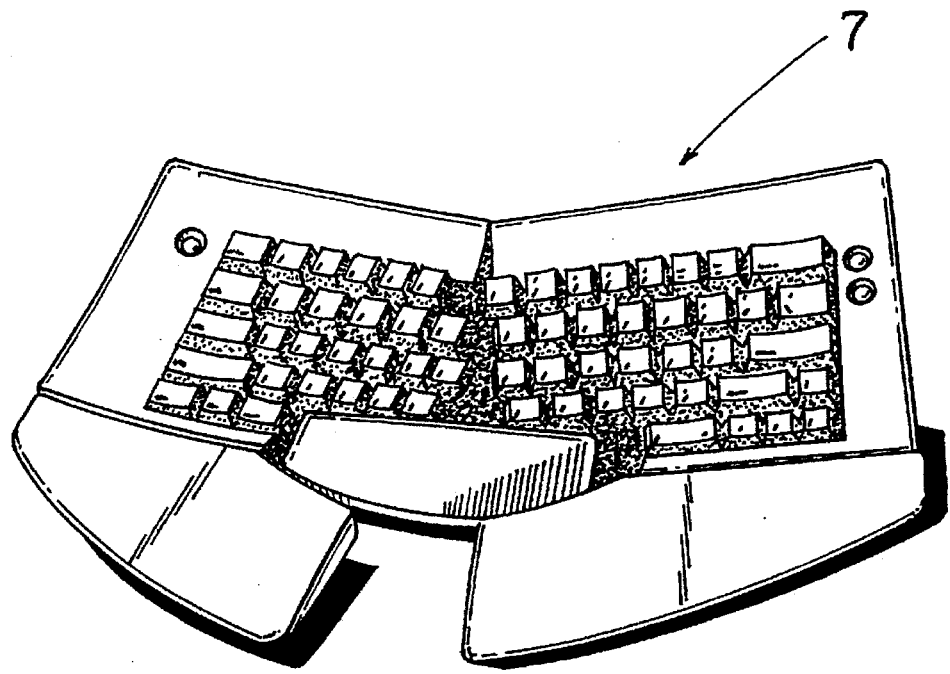
FIG. 2 is a perspective view of a revised computer keyboard.

Referring to FIG. 2, a modem keyboard 7 is shown which overcomes the dangerous angle position, however, as can be seen, this keyboard 7 requires extensive new hardware to be purchased for the existing computer system. In contrast, the present invention discloses a method of overcoming the dangerous angle position without the use of additional hardware.

Figure 3A:
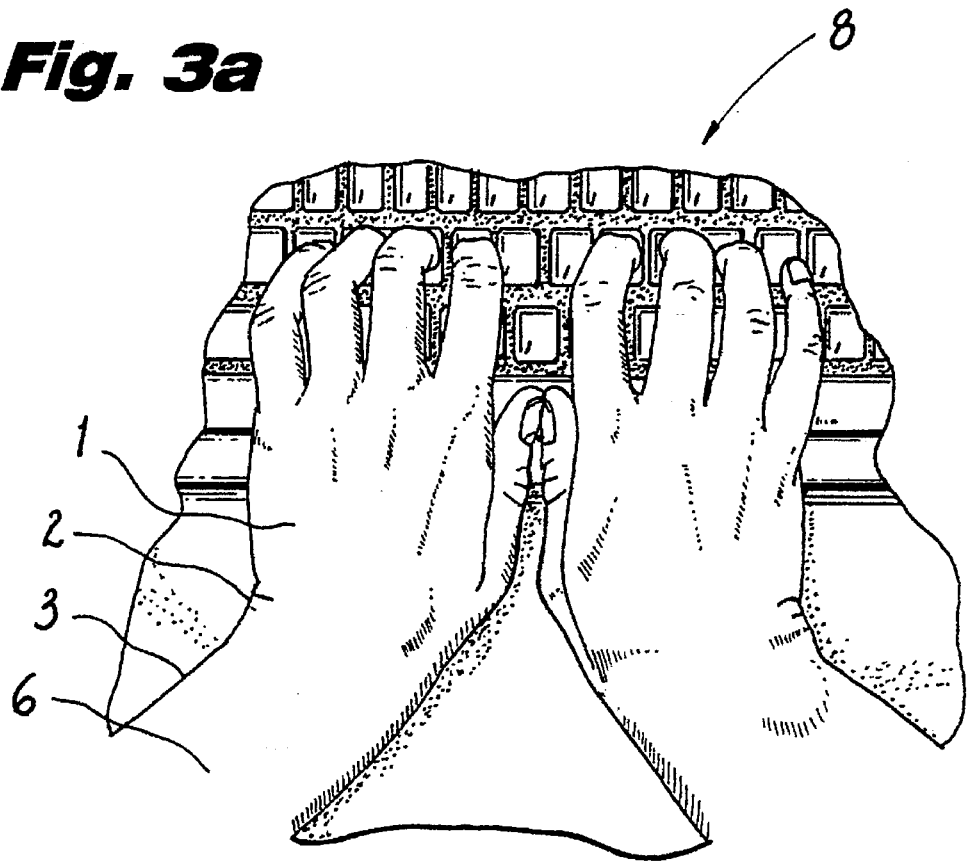
FIGS. 3a–3b are top views of a typist's hands showing the difference between the angled wrist position and a natural line position in relation to a computer keyboard.
Figure 3B:
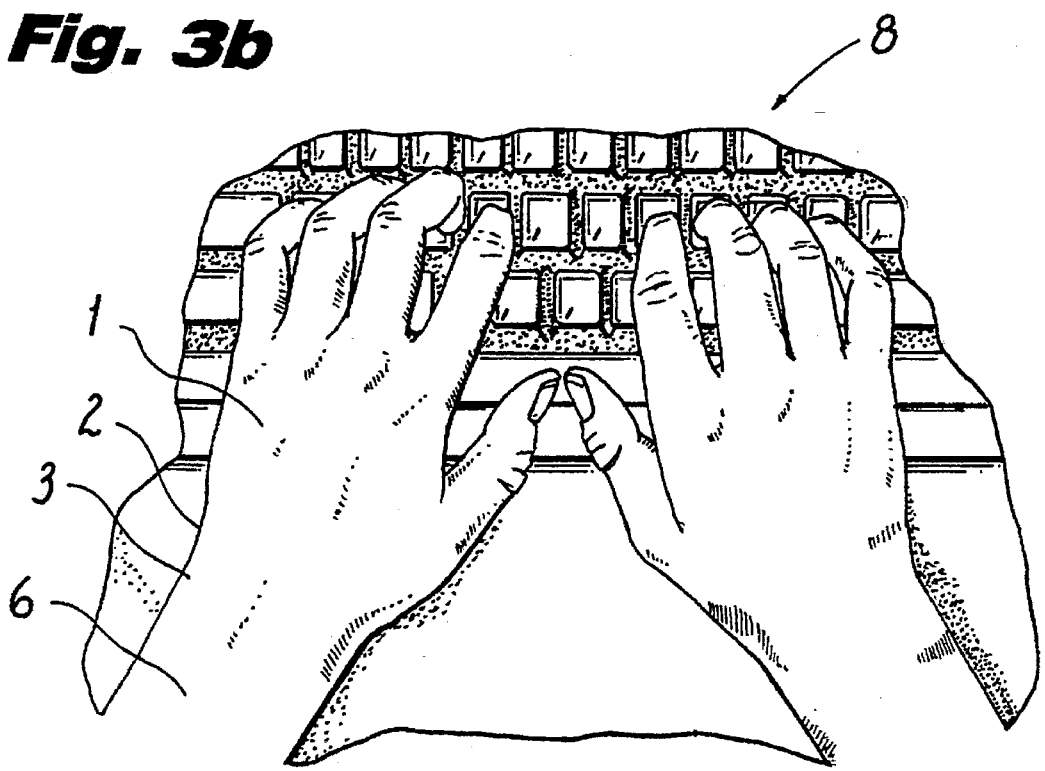
Figure 4A:
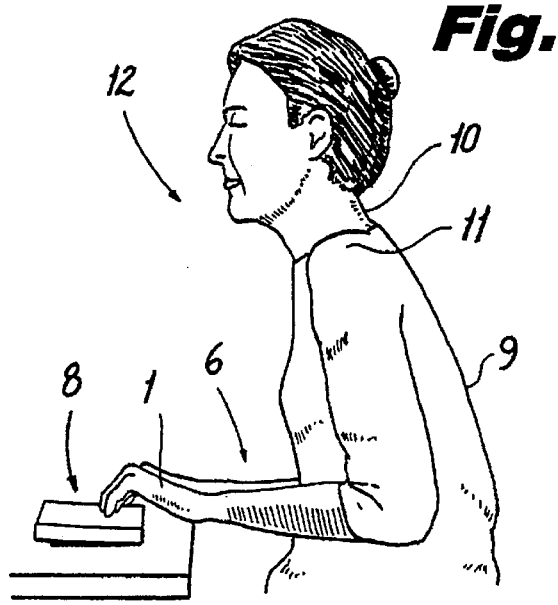
FIGS. 4a–4d are side views of a typist at a keyboard illustrating various positions.
Figure 4B:
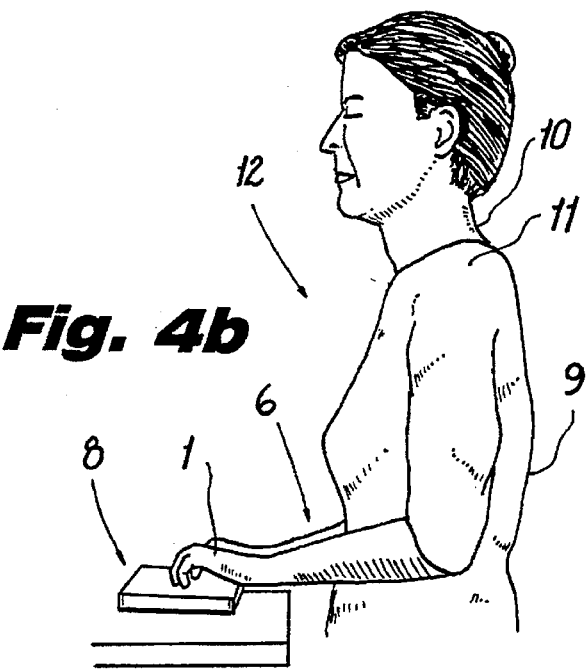
Figure 4C:
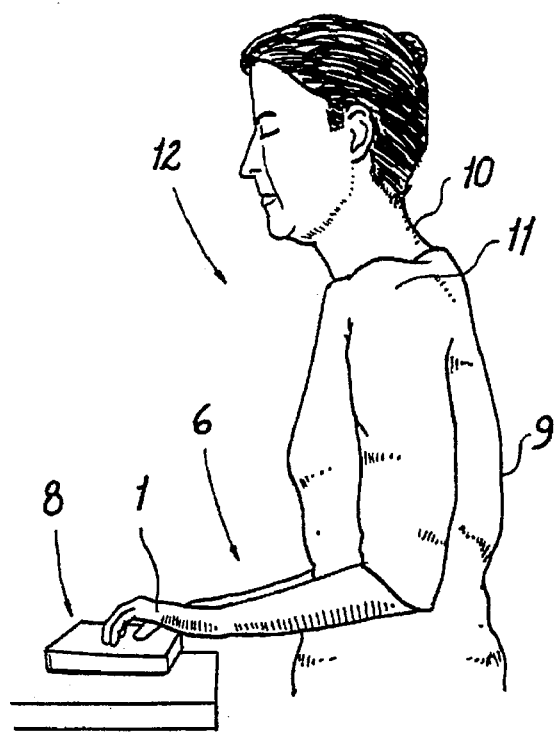
Figure 4D:
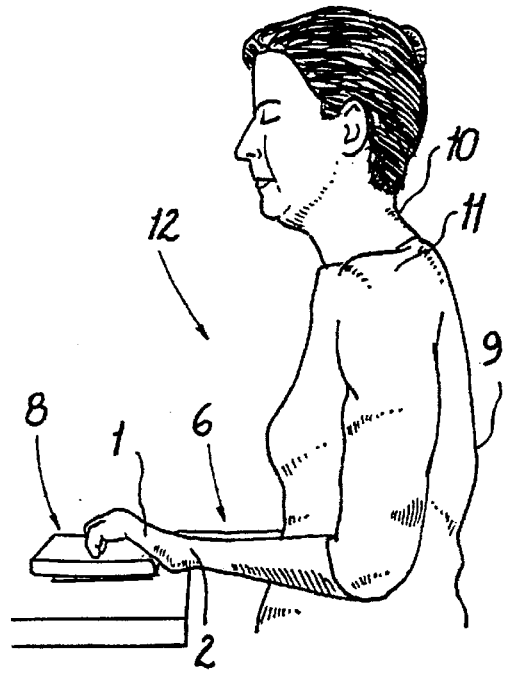

Referring to FIGS. 3a-3b, the difference between the angled wrist position (FIG. 3a) and the natural line position (FIG. 3b) are illustrated in relation to a conventional computer keyboard 8. This method teaches the natural line position and includes the steps of placing the hands 1 on the keyboard and without typing, moving from the natural line position of FIG. 3b to the angled wrist position of FIG. 3a and then back to the natural line position of FIG. 3b. The hands 1 are then conditioned to distinguish the difference between the technique of correct alignment as opposed to the strained technique used during misalignment. The hands 1 are then placed on the keys and with the arms 6 and wrists 2 in the natural line position, the typist is to begin typing at a slow and gentle pace. Although this method will result in an adjustment of only a few inches or less, this realignment will improve the typist's efficiency in comparison to the angled wrist position. Referring to FIGS. 4a-4d, examples of known improper sitting positions are illustrated. Sitting in a slumped position as in FIG. 4a or an over-arched position as in FIG. 4a force both the back 9 and neck 10 areas into unnatural, cramped and strained positions. This forces the neck 10 and shoulders 11 to tighten, which interferes with proper typing. Similar problems arise when the chair in which the typist is sitting is too high, which results in the arms 6 and hands 1 reaching for the keyboard 8 in a downward angle. There is also for a tendency for the typist 12 to lean slightly forward, also shown in FIG. 4c. In contrast, when the chair is positioned too low, the typist 12 will have a tendency to rest the wrists 2 on a wrist pad or on the desk as in FIG. 4d.

Figure 5A:
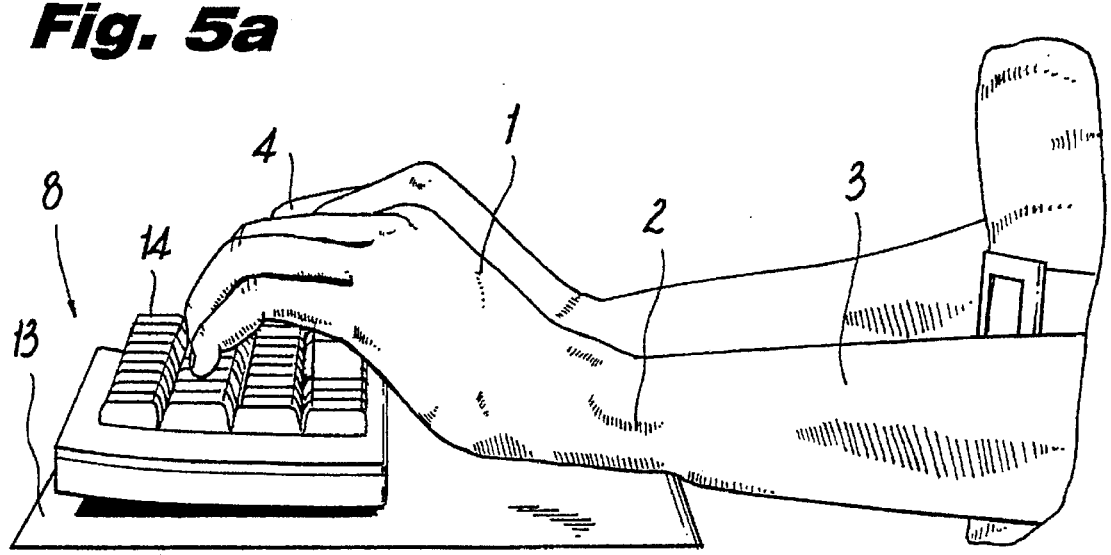
FIGS. 5a–5c are side views of a typist's wrist illustrating various wrist positions.
Figure 5B:
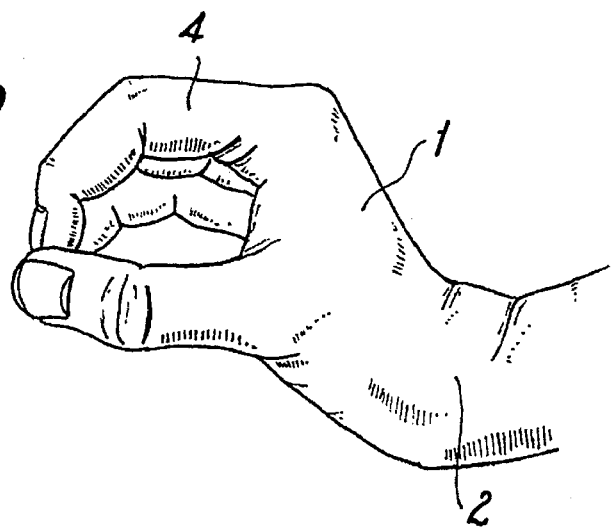
Figure 5C:
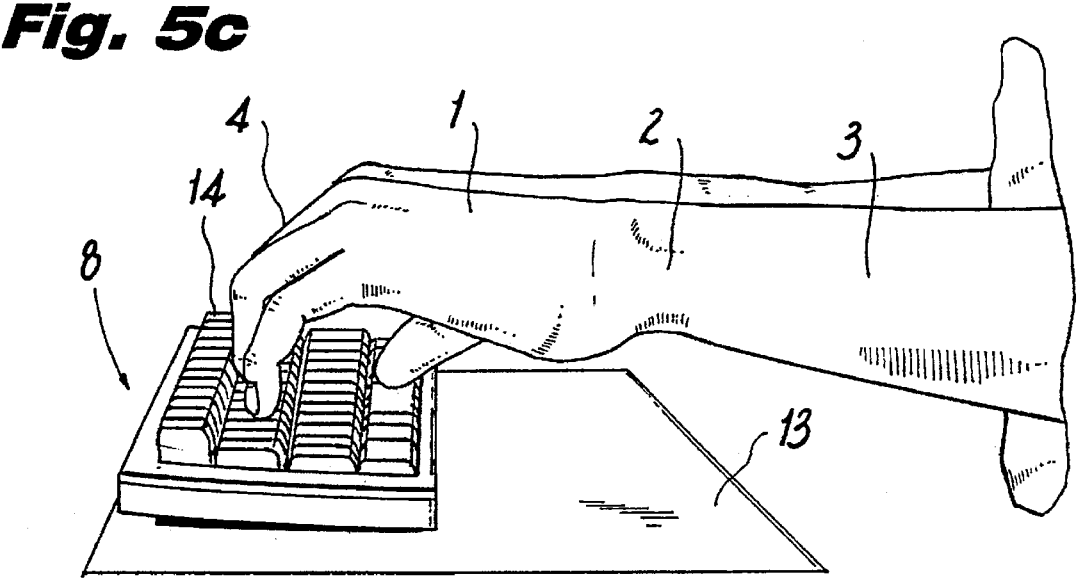

Referring to FIGS. 5a-5c, the dangers of the wrist 2 resting on the desk surface 13 is illustrated more clearly. The wrist 2 resting on the desk surface as in FIG. 5a is described as the cobra position as shown in FIG. 5b because of the wrist being bent upward and the fingers 4 being raised in an effort to reach the computer keys 14. The wrist 2 resting on the desk surface has been associated with repetitive stress injuries or cumulative trauma disorders, most particularly, carpal tunnel syndrome. When the forearms 3 and wrists 2 are in their correct orientation as shown in FIG. 5c, the forearms 3 and wrists 2 are level and parallel to the floor. This eliminates the need for the wrist 2 to angle up into the cobra position of FIG. 5b and substantially reduces the risk of repetitive stress injuries or cumulative trauma disorders. The orientation of the wrists 2 and hands 1 of FIG. 5c is known as the floating wrist 2 position. This method teaches the floating wrist position and includes the steps of dropping the hands 1 to the sides of the body, angling the wrists 2 upward, slowly dropping the wrists 2 back to a relaxed position and repeating the raising and lowering of the hands 1 at the wrist to distinguish the difference between the strained technique of holding the hands up at the wrist and the natural technique of letting the wrists 2 hang from the arms. This method further includes repeating these steps using a computer keyboard 8. It should be observed whether the wrists 2 are angled upward when sitting with the chair (not shown) adjusted as to its usual height. The chair should then be raised or lowered to eliminate any upward bend of the wrist. The keyboard 8 may need to be lowered for proper adjustment.

Figure 6:
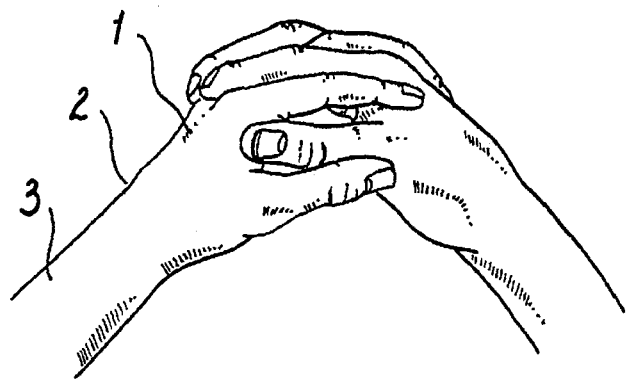
FIG. 6 is a top view of a typist's hands in a clasped position.

Another important aspect of proper chair adjustment includes the distance from the sitting position to the computer keyboard. Sitting too close will result in the elbows being pressed into the sides and the wrists 2 will be forced into the dangerous angle position. The circulation which is naturally flowing throughout the arms 6 from the shoulders, down through the elbows to the fingers 4, will be constricted. This will significantly reduce the efficiency of the typist. To overcome this position, the hands 1 should be placed on a flat surface in a triangle position as shown in FIG. 6. The hands 1 should be clasped and the elbows allowed to move naturally in a triangular position.

This position should then be moved to the keyboard 8 itself and the chair adjusted so that the hands 1 and elbows can move to a natural and relaxed triangle position. The elbows should be hanging freely from the shoulders and may or may not be touching the sides, which depends on the particular build of the typist 12.

Figure 7A:
FIGS. 7a–7c are perspective views of a typist's hands illustrating the different elbow positions.
Figure 7B:
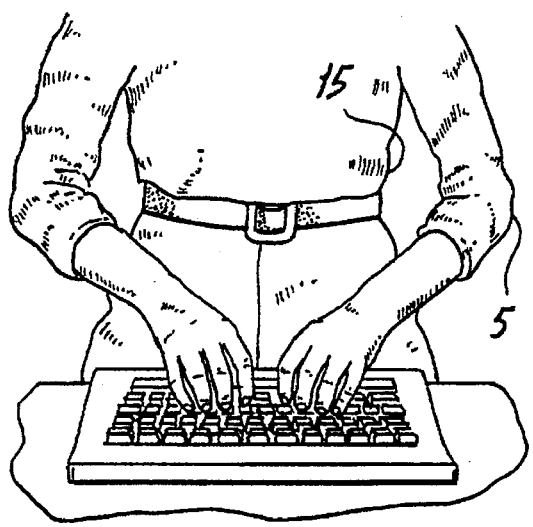
Figure 7C:
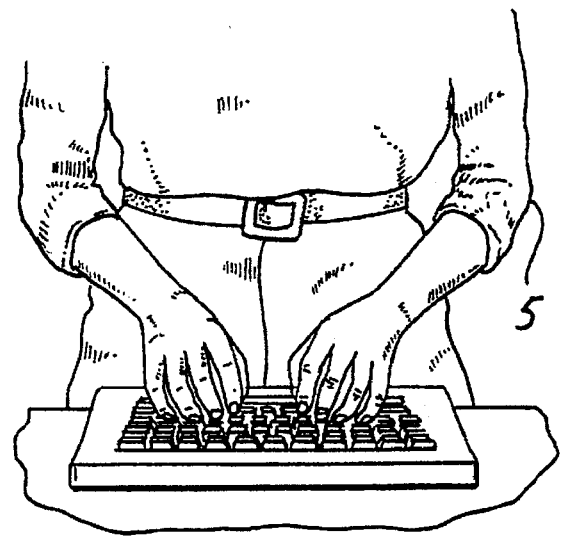

This position is taught by a method as shown in FIGS. 7a-7c. This method includes the steps of sitting at the keyboard 8 with the elbows 5 "glued" to the sides as shown in FIG. 7a, noticing the wrists 2 angled into the dangerous angle position. The method then continues by keeping the hands 1 on the keyboard 8 while moving the elbows away from the body as shown if FIG. 7b, repeating this motion in a pendulum manner until the elbows come to rest in their natural position as shown in FIG. 7c. The hands 1 and wrists 2 will then be in a natural, fluid line. The elbows may or may not be touching the sides 15 lightly, depending on the physique.

After "ungluing" the elbows, the next step is to relax the wrists 2 and avoid the "frozen wrist position". The frozen wrist position results when there is rigidity, tightness or tension in the wrists 2 or slightly higher up in the forearms. When the wrists 2 are not relaxed, all of the weight, energy and strength of the forearms 3 is constricted and cannot pass through to the fingers 4.

To avoid the frozen wrist position, this method teaches the steps of resting the right hand on a table with the fingertips down and the palm raised just above the table, letting the weight sink into the fingers from the arm until the fingers grow slightly warm, holding the right elbow with the left hand and gently swinging the right elbow forward an inch or two while letting the wrist rise and then allowing it to fall back towards the table. These steps are repeated several times until the natural position is determined. These steps are then repeated using the right hand alone and refining the natural position. This position should be a fluid position and not rigid. This method is known as the swing based on the swinging motion of the elbow and subsequent follow through of the wrist. This method should be repeated at any time the typist observes the wrist tightening.

Referring to FIGS. 8a–8d, the spider and rainbow positions are illustrated. The spider position is shown in FIG. 8a and is the result of curling the fingers 4 upward and away from the hand. This creates a great deal of tension under the wrist 2 and in the knuckles. The preferred position is shown in FIG. 8b which is known as the rainbow position. The spider position of FIG. 8a constricts the vital circulation to the fingers 4 and is completely contrary to the hand's 1 natural muscular balance. This method enables the typist to overcome the spider position. The right hand 1a is held out in the spider position as shown in FIG. 8c. The left hand 1b (not shown) is positioned under the knuckles and slowly raises them until the bridge of the right hand 1a assumes the rainbow position as shown in FIG. 8d, and until the fingers 4 relax and the knuckles become more flexible. The fingers 4 will become gently curved, and this curve will depend upon the length of the fingers 4 with respect to the amount of curvature. To determine the natural curvature of the hand, the hand 1 is dropped into the lap or rested on a table with the fingertips down and completely relaxed, the hand 1 is observed in its natural curved position which is then imitated at the keyboard 8. The hand 1 should maintain the same position at the keyboard 8 as it does in the natural resting position which is a critical aspect of the invention.

Figure 9E:
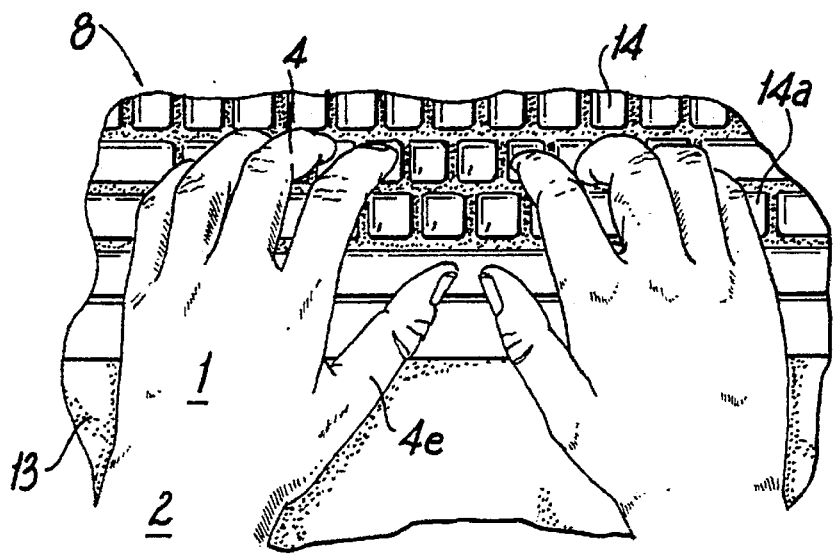

Referring to FIGS. 9a–9e, the problems associated with sore or strained thumbs is overcome. All of the positions illustrated are recommended in various typing courses. FIG. 9a is an illustration of a classic typing position where the thumbs 4e are bent. FIG. 9b shows another classic typing position where the thumbs 4e are arranged in a "comma" position. FIG. 9c illustrates the position where the thumb 4e is tucked under the palm. All three of these positions require the thumb 4e to be tensed in an unnatural way, with the muscles continually contracted. When the thumb 4e is constricted, the entire hand 1 is affected. The thumb 4e can be trained to assume a natural position by dropping the hand 1 to the side in a completely rested position as shown in FIG. 9d. The position is maintained when utilizing the keyboard 8 as shown in FIG. 9e. This position allows the thumbs 4e to stay in a relaxed configuration where there may or may not be a slight, natural bend at each knuckle. This will depend on the shape of an individual's thumb; however, the thumbs 4e should be completely free and loose. The space bar should be engaged by a small up and down motion of the thumb 4e and not a sideways or in and out motion. A straight up and down motion is less stressful than a sideways motion and therefore, more efficient. It is also natural for the hand 1 to rotate slightly with the thumb 4e when engaging a space bar. An essential element of this technique is to never resist natural movement. Therefore, the hand 1 should move with the fingers 4 or the thumb 4e when following a natural motion. When not using the thumbs 4e, they should rest lightly on the space bar.

Referring to FIGS. 10a–10e, the ring 4c and pinky fingers 4d are shown in various configurations. The conventional keyboard 8 has not been changed in over 100 years and is notoriously awkward. It is common to utilize incorrect finger positioning to avoid using the pinky 4d and ring fingers 4c as these two fingers are the weakest of all fingers. Although not as short as the pinky finger 4d, the ring finger 4c is more susceptible to injury than the other fingers because the muscles of the ring finger 4c are intertwined with those of the middle finger 4b. Thus the ring finger 4c can never be completely independent of the other fingers 4. This can be demonstrated by placing the right hand 1a on a table with the fingertips down and gently trying to lift the ring finger 4c without moving the other fingers 4. It will be difficult to move the ring finger 4c more than a fraction of an inch. Injury to the ring finger 4c is typically a result of trying to isolate it from the other fingers 4.

Figure 10A:
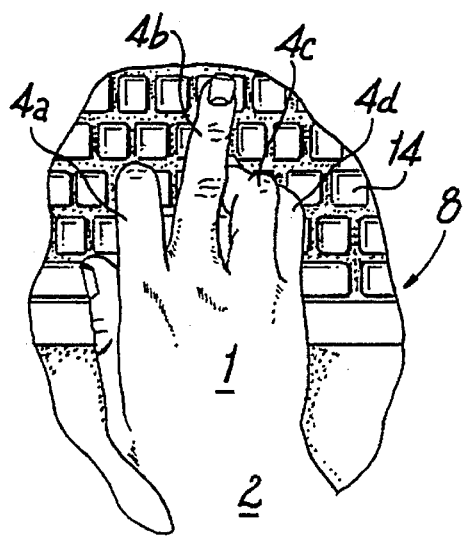
FIGS. 10a–10e are top and side views of various ring and pinky finger positions.
Figure 10B:
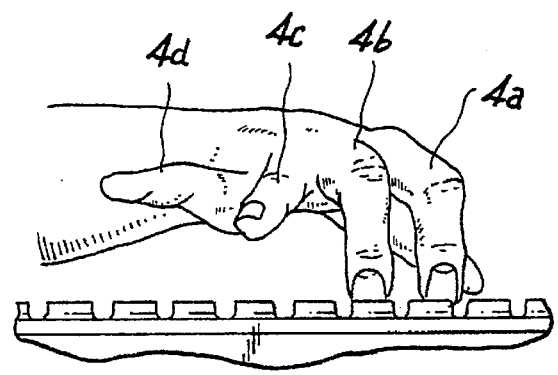
Figure 10C:
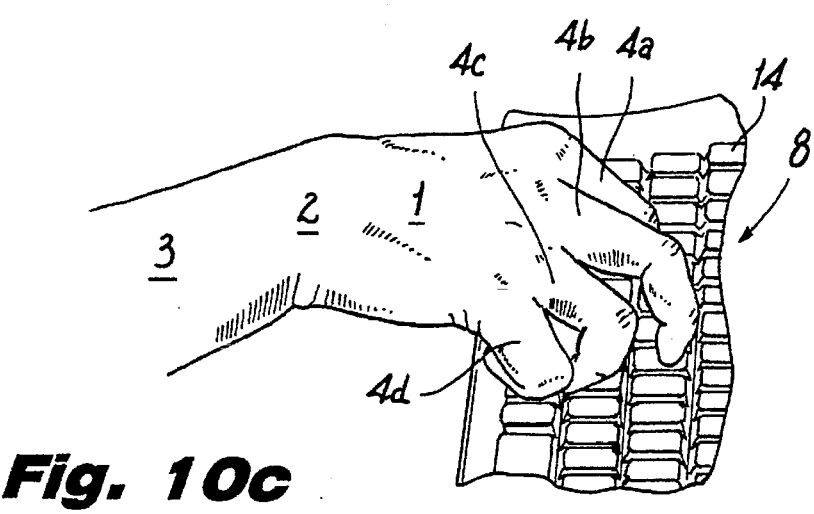
Figure 10D:
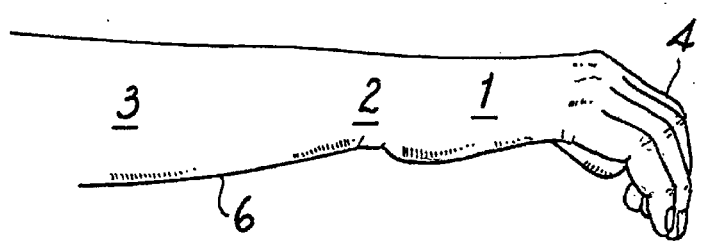
Figure 10E:
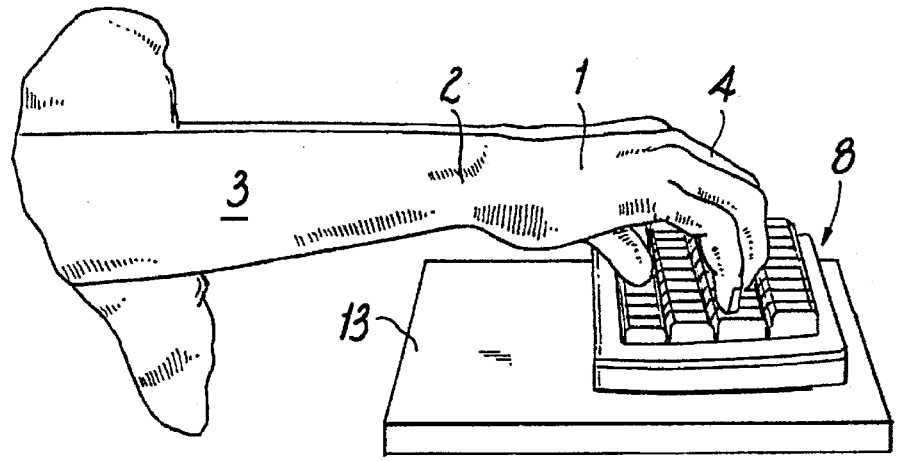

Improper use of the ring 4c or pinky fingers 4d may result in sore, tired or tender fingers 4. In extreme, the pain can radiate up the palm, through the wrist 2 and shoot through the entire arm. Improper usage may also result in a "curling" sensation as though the finger wants to fold back into the hand. The pinky 4d and ring fingers 4c may also be uncomfortable in a simply extended position. These conditions are typically a result of holding either or both of the ring 4c and pinky fingers 4d in a continually contracted position. FIG. 10b illustrates the ring 4c and pinky fingers 4d in a "fly" position. FIG. 10c illustrates the ring 4c and pinky fingers 4d in a curled position. To overcome improper usage of the ring 4c and pinky fingers 4d, the right hand 1a should be placed in a relaxed configuration as shown in FIG. 10d. The relaxed position should then be utilized with a keyboard 8 as in FIG. 10e. The left hand 1b should be placed over the right hand 1a to feel the natural curved position, how much weight can be supported by the hand, and how each finger 4 contributes to the support of the whole hand. This method teaches the relaxing of the ring 4c and pinky fingers 4d. This is accomplished by dropping the hands 1 down at the sides in a relaxed position. The arms 6 should gently swing and the fingers 4 wiggle. The ring 4c and pinky fingers 4d should be observed moving lightly and easily in a dropped position. The hand 1 should be raised to the keyboard 8 and engaged in gentle typing. The "dropping" technique in the ring 4c and pinky fingers 4d should be retained. The flying or curling positions with regard to the ring 4c and pinky fingers 4d should be avoided.

Figure 11A:
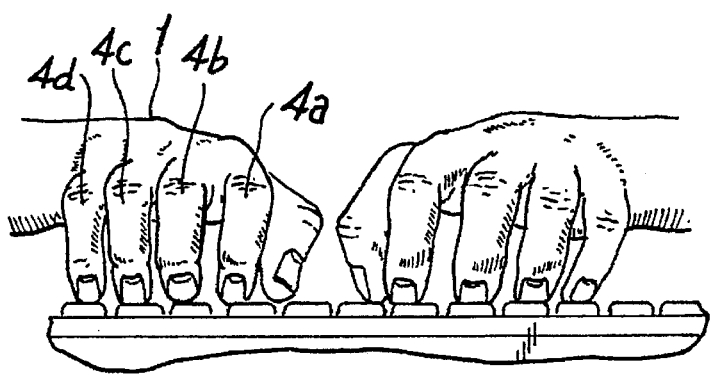
Figure 11B:
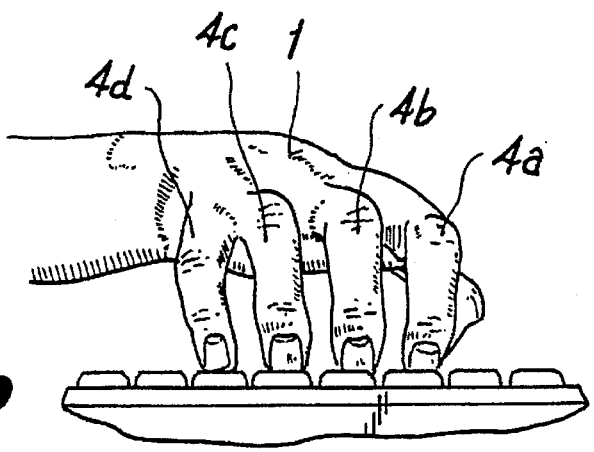

Referring to FIGS. 11a–11c, the correct "at home" position is illustrated by comparison of FIGS. 11a and 11b with FIG. 11. The "home" position 14a (as may be seen in FIG. 9e ) refers to the middle row of keys: a, s, d, f, covered by the left pinky 4d, ring 4c, middle 4b and index fingers 4a respectively; and semi-colon, l, k, and j covered by the right pinky 4d, ring 4c, middle 4b and index fingers 4a, respectively. From the home position 14a, the fingers 4 travel up to cover all of the other keys. Therefore, the correct home position 14a is critical to efficient typing. FIG. 11a illustrates the claw position. In this position, the bridge of the hand 1 is flattened out into an even line. This position is duplicated by placing the fingers 4 on a table with the palm down and then drawing the fingers 4 inward towards the palm as if scratching the fingernails across the blackboard. The position should be held for ten seconds to illustrate the amount of tension in the claw position. FIG. 11 b also illustrates the claw position. This position is overcome by this method which teaches the correct at home position. The hand 1 should be rested on a table in a relaxed position and the inherent or natural tilt of the knuckles observed. The fingers 4 should then be placed on the home keys of the keyboard 8 in a natural tilt position as shown in FIG. 11c. The thumbs 4e should be rested naturally on the space bar.

Figure 12C:
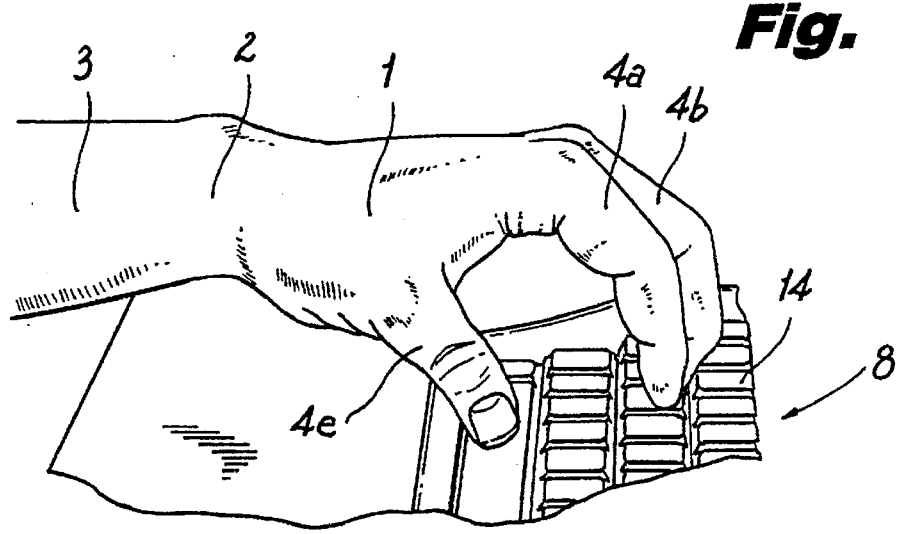

Referring to FIGS. 12a–12c, the incorrect motion associated with "lifting" and "snapping" are illustrated. Both of these methods are taught in conventional typing classes. For example, typing with high raised fingers 4 is similar to lifting the feet a foot off the ground each time a step is taken. This is known as climbing the stairs which is shown in FIG. 12a. A second unnecessary motion involves snapping the fingers 4 towards the palm in a scratching motion in FIG. 12b. This is similar to the climbing stair position in that the fingers 4 are overcompensating, however these fingers 4 are overcompensating in the opposite direction. Both motions are unnecessary and can strain both extensor muscles (in the case of "lifting") and flexor muscles (in the case of "snapping"). The scratching position is shown in FIG. 12b. The correct position is shown in FIG. 12c. This motion entails allowing the fingers 4 to drop naturally onto the keys. Therefore, the action of the fingers 4 is working with gravity and not against gravity.

A similar technique associated with dropping the fingers 4, involves "idling" the fingers 4. Idling involves the simple coordination of keeping the unused fingers 4 free and relaxed. This method is used to teach the dropping and idling motion. The fingers 4 are placed in the home position and the fingertips rested lightly on the keys. The index fingers 4a are then dropped and released on their respective keys several times. It should be observed how far the key goes down and springs back upwards. It should then be observed how the fingers 4 work with gravity. This process should be repeated with the middle fingers 4b, ring fingers 4c and pinky fingers 4d. The hand 1 should rock slightly as the keys go downward. As the keys are released and moved back to their original position, the hands 1 will naturally rock back to the original position.

Figure 13:
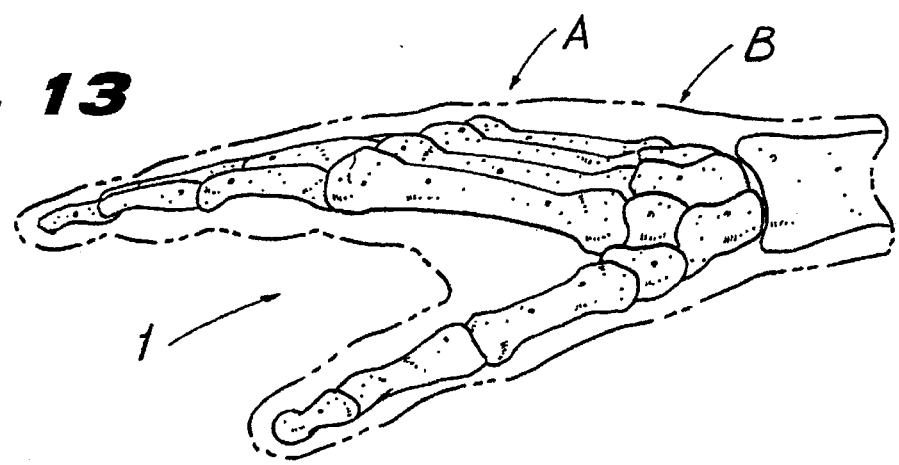
FIG. 13 is an illustration of the skeletal structure of the hand.

Referring to FIG. 13, many people type as if their fingers 4 start at position; however, the fingers 4 actually start at the position B. Therefore, the fingers 4 are actually twice as long as can be observed by the naked eye.

Figure 14A:
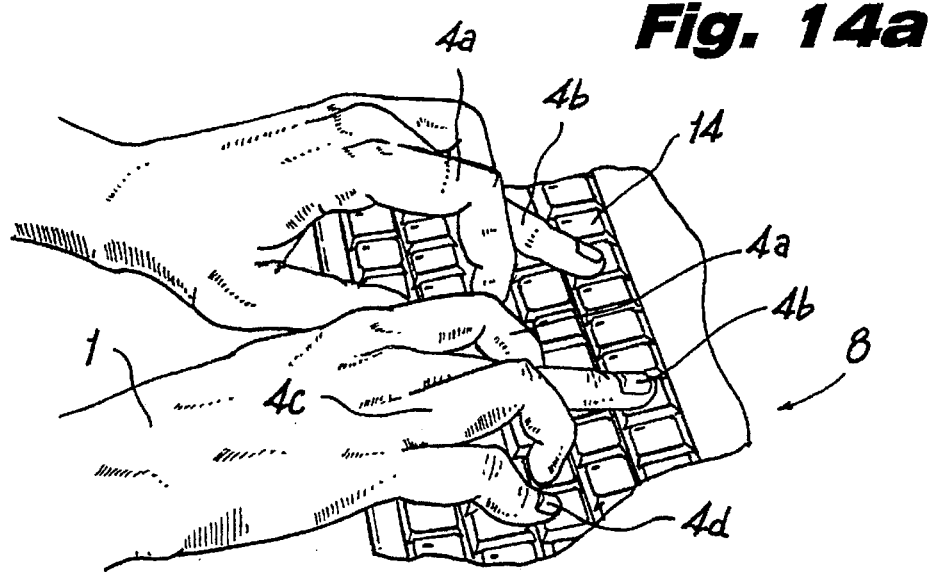
FIGS. 14a–14b are perspective views of the protruding position and the preserving the curve position.
Figure 14B:
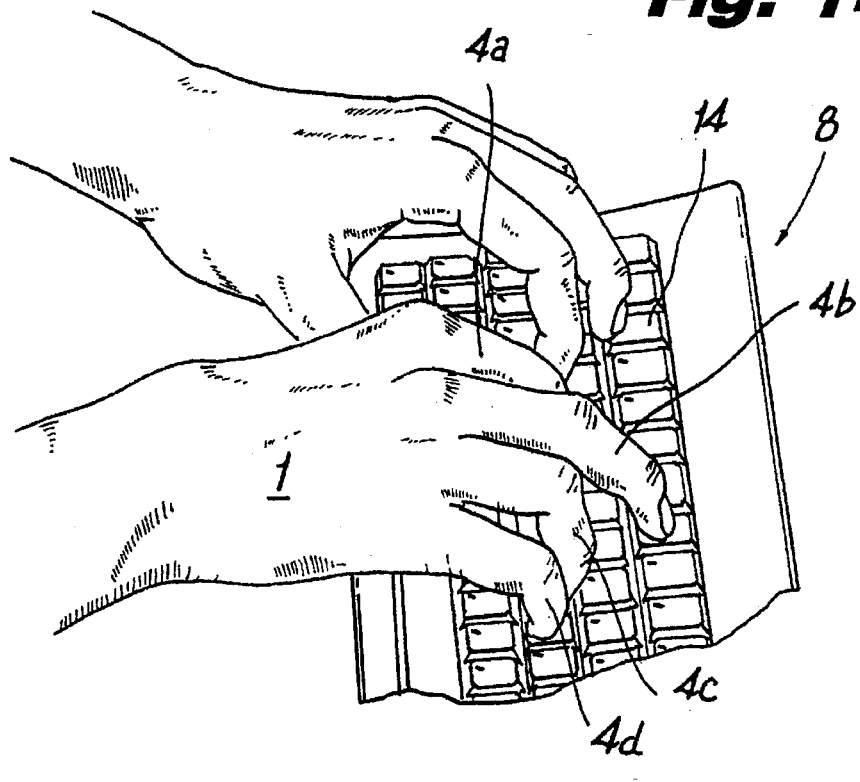

Referring to FIG. 14a–14b, the protruding and preserving the curved positions are illustrated. FIG. 14a shows the middle fingers 4b in a protruded position which is the result of reaching incorrectly. Reaching in this manner collapses the natural arch of the hand 1 and effectively cuts the fingers 4 in half at the bridge breaking the natural curve. In contrast, FIG. 14b illustrates the natural curve of the hand.

Figure 15A:
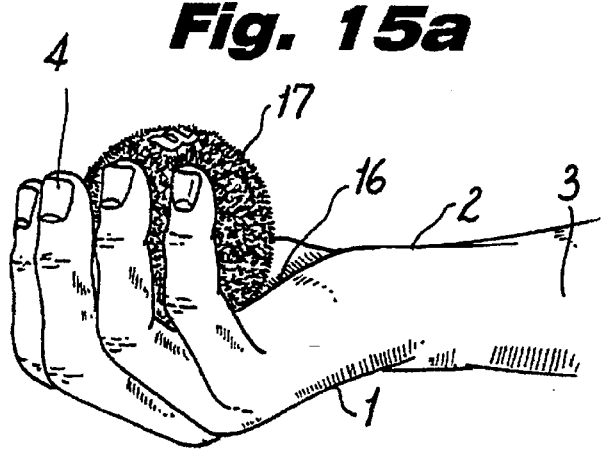
FIGS. 15a–15c are side and top views of the palm with and without an object.
Figure 15B:
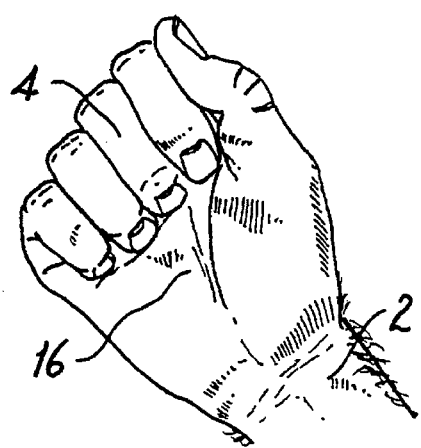
Figure 15C:
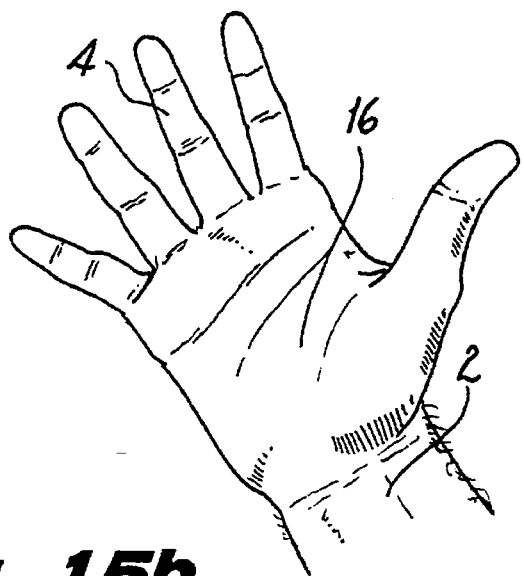

Referring to FIGS. 15a–15c, the natural curve of the hand 1 can be taught using this method. An object 17 such as a tennis ball or an orange is placed in the palm of the hand 1 with the palm facing in an upward direction as shown in FIG. 15a. The user then expands the hand as if tossing the ball 17. This method can also be completed without using an object such as in FIGS. 15b where the hand 1 is contracted into a closed position and then opened as in FIG. 15c. The hand 1 should then be rested on the keyboard 8 in the shape of an orange. This position corresponds easily and comfortably to the home row. The curve of the finger should be slightly expanded to reach the row of keys above the home row and then returned back to the home row. To reach the row of keys below the home row, the curve of the fingers 4 should be slightly condensed and then moved back to the home row. The hand 1 should be expanded to the shape of a grapefruit to reach the outer keys.

Figure 16A:
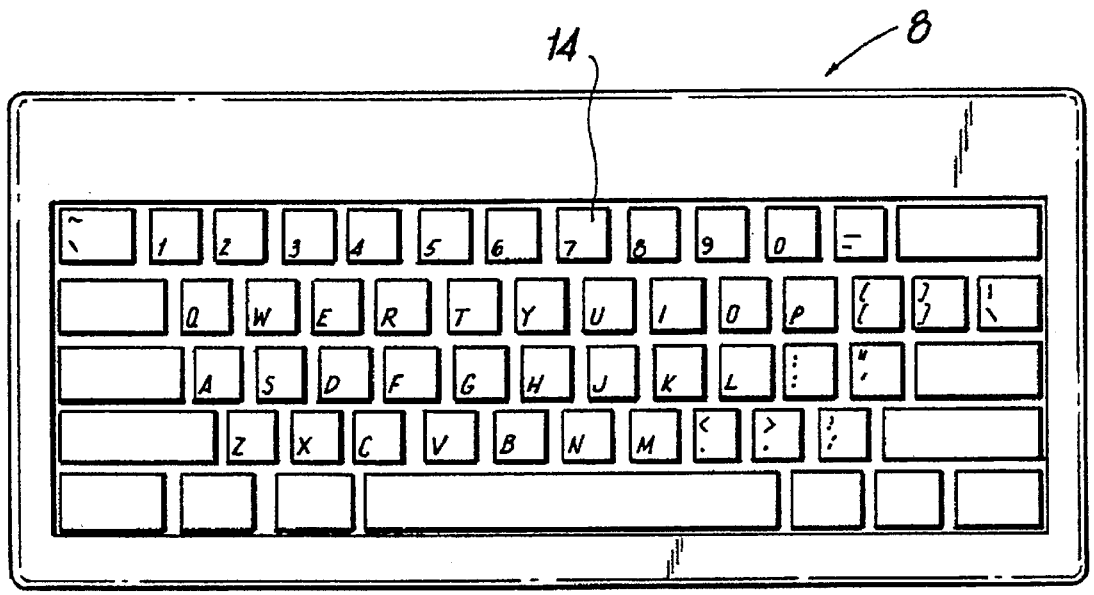
FIGS. 16a–16b are a top view of a conventional computer keyboard and a directional diagram, respectively.
Figure 16B:
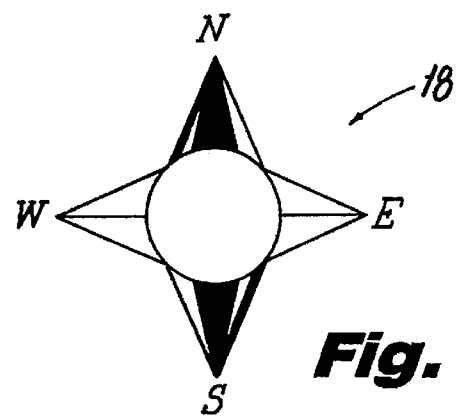

Referring to FIG. 16a–16b, a method is illustrated regarding travelling safely from the home position. This method involves, without typing, concentrating on the motion of travelling in a northern direction as indicated in FIG. 16b, towards the number keys. The motion should begin from the elbows and the wrist should "give" with the motion. The wrist may rock up slightly with the fingers and rock back down when returning to the home position. Moving in a southern direction as shown in FIG. 16b, from the home position to the lower row, the motion should start with the elbows as if you're pulling out a drawer and then returning to the home position. Moving now in a east and west direction as illustrated in FIG. 16b, the hands are moved to the keys on the right and left-hand side of the keyboard 8. The outside of the keyboard 8 should be viewed as an arc, where the hands roll out around the arc. The hands are then rotated as if turning doorknobs and then returning to the home position. The wrist will then naturally adjust the motion for the various keys. Actual typing should then be attempted while trying out the three various motions, which include a north-south motion, east-west motion and an arc type motion. It is important that the hands and wrists are not "left behind" when the fingers travel from the home position. It is even more important that a natural motion is never resisted.

Figure 17A:
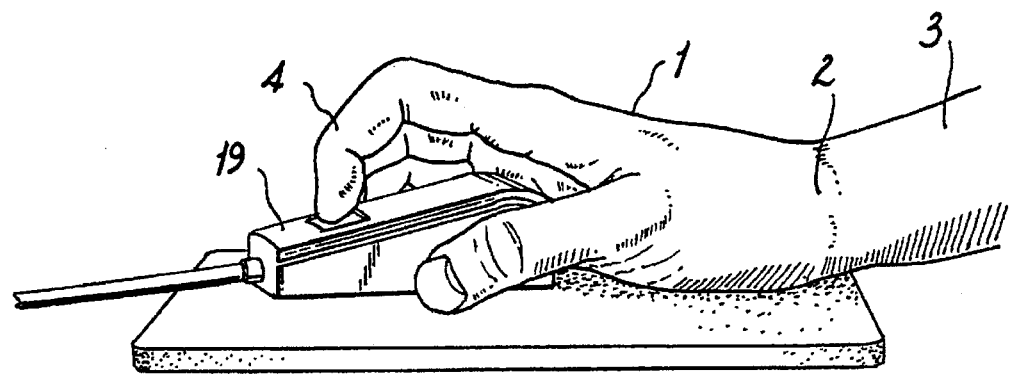

Referring to FIG. 17a–17f, the proper hand position is shown in relation to a computer mouse. FIG. 17a illustrates "the push-up position" because the fingers are raised similar to the cobra position. Similarly, FIG. 17b and 17c illustrate the angled wrist position in relation to the computer mouse. FIG. 17d illustrates the incorrect position of squeezing the mouse. FIG. 17e illustrates the incorrect position of "pointing" at the mouse. The correct position is illustrated in FIG. 17f which is referred to as "draping" the mouse. This position is accomplished by draping the fingers over the mouse. The hand should be completely relaxed and the fingers loose. In addition, instead of depressing the mouse using only the index finger, two fingers can also be utilized. This method teaches the correct "mousing" technique. The fingers should be draped over the mouse without squeezing or pointing the fingers and pressing the wrist down at the mouse, raising the fingers in the push-up position, or angling the wrist in the angled wrist position. With the computer off, draw imaginary circles with the mouse on a desk surface. The circles should be drawn in counterclockwise and then a clockwise motion. The motion should begin from the shoulder and the entire arm should be used. After forming imaginary circles, figure-eights can be formed. The computer should then be turned on and the movement continued. The technique should be fluid and not uncomfortable.

While the embodiment of the invention shown and described is fully capable of achieving the results desired, it is to be understood that this embodiment has been shown and described for purposes of illustration only and not for purposes of limitation. Other variations in the form and details that occur to those skilled in the art and which are within the spirit and scope of the invention are not specifically addressed. Therefore, the invention is limited only by the appended claims.

What is claimed is:

1. A method for providing a natural line between the hand, wrist and forearm, comprising the steps of:

moving the hand and wrist in a straight line with the forearm thereby forming a natural line position;

reaching for an object with the hand and allowing the elbow to follow the hand naturally;

angling the hand and wrist sideways relative to the forearm, thereby forming an angled wrist position;

returning the hand, wrist and forearm to said natural line position; and placing the hand on a keyboard while maintaining said natural line position.

2. The method of claim 1 further comprising the steps of:

placing the hand on a keyboard and without typing, moving the hand from said natural line position to said angled wrist position and then moving the hand back to said natural line position; and placing the fingers on the keys and with the forearm and wrist in said natural line position, typing at a slow and gentle pace.

3. The method of claim 1 further comprising the steps of:

dropping the hand down to the side of the body;

angling the wrist upward and then letting the wrist slowly drop back in a downward position and relaxing the hand so that the hand is relaxed in said natural line position;

distinguishing between the strained technique of holding the wrist up and a natural technique of letting the wrist hang from the shoulder;

placing the hand on the keyboard and maintaining said natural line position while typing;

observing if there is any upward bend at the wrist; and raising or lowering the keyboard until the wrist is completely relaxed while maintaining said natural line position.

4. The method of claim 1 further comprising the steps of:

moving the elbow towards the side of the body and away from the side of the body and repeating the movement in a pendulum motion; and reducing the movement until the elbow comes to a resting position, thereby allowing the hand and wrist to be in said natural line position.

5. The method of claim 1 further comprising the steps of:

resting the first hand on a flat surface with the fingertips downwardly engaging said surface and the palm positioned above the table;

allowing the weight of the forearm to rest on the fingers until the fingers lightly support the forearm's weight;

moving the first elbow using the second hand and gently swinging the first elbow forward until the first wrist rises and then allowing the first wrist to return; and moving the fingers up and down while moving the elbow using the second hand until the movement of the fingers requires the least effort.

6. The method of claim 1 further comprising the steps of:

moving the fingers upward in relation to the palm of the first hand thereby forming a spider position; and reaching with the second hand under the knuckles and slowly raising the knuckles of the first hand until the fingers relax, thereby forming a natural curve position of the fingers.

7. The method of claim 6 further comprising the steps of:

resting the first hand on a flat surface in a relaxed position with the fingertips engaging said surface, thereby forming said natural curve position of the fingers; and moving the hand to the keyboard while maintaining said natural curve position.

8. The method of claim 1 further comprising the steps of:

dropping the hand to the side in a relaxed position thereby forming a natural thumb position;

moving the hand to the keyboard and engaging the keys with the fingers while maintaining the hand in said natural thumb position; and moving the thumb in said natural thumb position in an up and down motion to depress the space bar and then release the space bar.

9. The method of claim 1 further comprising the steps of:

resting the hand on a flat surface with the fingertips downwardly engaging said surface thereby forming a relaxed hand position;

drumming the fingers by moving the fingers in an up and down motion against said surface;

tightening the fingers; and drumming the fingers while allowing the fingers to relax in said relaxed hand position.

10. The method of claim 1 further comprising the steps of:

resting the hand on a flat surface in a relaxed position with the knuckles naturally tilted thereby forming a natural tilt position;

moving the hand to the keyboard while maintaining said natural tilt position; and resting the thumb on the space bar in a relaxed position.

11. The method of claim 1 further comprising the steps of:

resting the fingertips lightly on the keys of a keyboard;

dropping the index finger on the respective key to move the key in a downward motion; and releasing the index finger from the respective key to allow the key to return to the original position while allowing the hand to rock slightly.

12. The method of claim 1 further comprising the steps of:

moving the hand to a flat surface with the fingertips downwardly engaging said surface and the palm positioned above said surface;

moving the hand to conform to a spherically shaped object having a first size;

moving the hand to conform to a spherically shaped object having a second size greater than said first size;

moving the hand to conform to said first object; and moving the hand to the keyboard while maintaining the shape of said first object.

13. The method of claim 1 further comprising the steps of:

moving the hand over a keyboard while maintaining said natural line position;

moving the hand in the north, south, east and west directions with respect to the keyboard while also moving the wrist, elbow and forearm; and typing while moving the hand in the north, south, east and west directions.

14. The method of claim 1 further comprising the steps of:

positioning the hand on a computer mouse which engages a flat surface while maintaining said natural line position; and moving the mouse in a circular motion on said surface using the hand and forearm while maintaining said natural line position.

\* \* \* \* \*